(12) United States Patent
Rakshit

(10) Patent No.: US 11,531,119 B2
(45) Date of Patent: Dec. 20, 2022

(54) COORDINATED SMART CONTRACT-BASED SATELLITE MANAGEMENT AND OPERATION

(71) Applicant: INTERNATIONAL BUSINESS MACHINES CORPORATION, Armonk, NY (US)

(72) Inventor: Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 306 days.

(21) Appl. No.: 16/880,855

(22) Filed: May 21, 2020

(65) Prior Publication Data

US 2021/0364648 A1    Nov. 25, 2021

(51) Int. Cl.
　　*G01S 19/25*　　(2010.01)
　　*G01S 19/40*　　(2010.01)
　　(Continued)

(52) U.S. Cl.
　　CPC ............. *G01S 19/258* (2013.01); *G01S 19/02* (2013.01); *G01S 19/40* (2013.01); *H04L 9/0643* (2013.01); *H04L 9/50* (2022.05)

(58) Field of Classification Search
　　CPC ........ G01S 19/02; G01S 19/258; G01S 19/40; H04L 9/0643; H04L 9/50
　　See application file for complete search history.

(56) References Cited

U.S. PATENT DOCUMENTS 10,291,316 B1　　5/2019　Schloemer
10,505,623 B2　12/2019　Metzger et al.
(Continued)

FOREIGN PATENT DOCUMENTS

CN　　107147489 A　　9/2017
WO　2019038585 A1　　2/2019

OTHER PUBLICATIONS

Wainscott-Sargent, A. "Blockchain: The Next Big Disruptor in Space", Nov. 2019, 11 pgs.
(Continued)

*Primary Examiner* — Dao L Phan
(74) *Attorney, Agent, or Firm* — Maeve Carpenter; Matthew M. Hulihan; Heslin Rothenberg Farley & Mesiti PC

(57) ABSTRACT

Coordinated smart contract-based satellite management and operation is provided by obtaining terms of smart contracts that govern utilization of a constellation of Earth-orbiting satellites, which form a space-based data center, in transmitting data between the constellation of satellites and ground stations for receiving data transmissions. Different service providers operate different satellites of the constellation and different ground stations of the collection, and the smart contracts further govern servicing of requests made between the different service providers. A service provider operates satellite(s) of the constellation pursuant to the smart contracts and ground station(s) of the collection of ground stations. This includes receiving a request for data stored on a satellite, selecting a device to which the satellite is to send the data, the selecting being made between at least (i) a ground station and (ii) another satellite of the constellation, and initiating sending the data to the selected device.

20 Claims, 6 Drawing Sheets

(51) Int. Cl.
  *H04L 9/06* (2006.01)
  *G01S 19/02* (2010.01)
  *H04L 9/00* (2022.01)

(56) References Cited

U.S. PATENT DOCUMENTS

| | | |
|---|---|---|
| 2019/0289018 A1 | 9/2019 | Metzger et al. |
| 2021/0281317 A1* | 9/2021 | Pham .................. H04B 7/18519 |

OTHER PUBLICATIONS

Hays, B., "Scientists want to blast holes in clouds with laser to boost satellite communication", Science News, Oct. 18, 2018, 10 pgs.

Mell, Peter, et al., "The NIST Definition of Cloud Computing", NIST Special Publication 800-145, Sep. 2011, Gaithersburg, MD, 7 pgs.

"SpaceBelt Data Security as a Service", Cloud Constellation Corporation, retrieved on Mar. 6, 2020 from the Internet URL: <http://spacebelt.com/>, 11 pgs.

"SES Networks Enables Direct Connectivity to IBM Cloud via Global Satellite Network", Business Wire via ITWeb, Luxembourg, Oct. 2018, retrieved on Mar. 6, 2020 from the Internet URL: <https://www.itweb.co.za/content/KA3WwMdIOKaMrydZ>, 3 pgs.

Sverdlik, Y., "Space: the Ultimate Network Edge", Data Center Knowledge | Business | Oct. 2016, retrieved on Mar. 6, 2020 from the Internet URL: <https://www.datacenterknowledge.com/archives/2016/10/17/space-the-ultimate-network-edge>, 8 pgs.

"ESA and SES-led Consortium to Develop Satellite-based Cybersecurity", SES | May 2018, retrieved on Mar. 6, 2020 from the Internet URL: <https://www.ses.com/press-release/esa-and-ses-led-consortium-develop-satellite-based-cybersecurity>, 6 pgs.

University of Geneva, "Bursting the clouds for better communication", PHYSORG | Oct. 2018, retrieved on Mar. 6, 2020 from the Internet URL: <https://phys.org/news/2018-10-clouds.html>, 3 pgs.

Henry, C., "Getting the cloud above the clouds (and surviving a dry spell)", Space News | Jan. 2018, retrieved on Mar. 6, 2020 from the Internet URL: <https://spacenews.com/getting-the-cloud-above-the-clouds-and-surviving-a-dry-spell/>, 4 pgs.

Nelson, P., "NASA to use data lasers to beam data from space to Earth", Disruptor | Network World | Aug. 2018, retrieved on Mar. 6, 2020 from the Internet URL: <https://www.networkworld.com/article/3301294/nasa-to-use-data-lasers-to-beam-data-from-space-to-earth.html>, 4 pgs.

Nelson, P., "Lasers will allow real-time satellite communications", Disruptor | Network World | Apr. 2015, retrieved on Apr. 14, 2020 from the Internet URL: <https://www.networkworld.com/article/2917271/lasers-will-allow-real-time-satellite-communications.html>, 3 pgs.

Various authors, "Laser Communication—an overview" | ScienceDirect Topics, retrieved on Apr. 15, 2020 from the Internet URL: <https://www.sciencedirect.com/topics/computer-science/laser-communication>, 11 pgs.

Cornwell, D., "Space-Based Laser Communications Break Threshold", Optics & Photonics | Issues | May 2016, retrieved on Apr. 14, 2020 from the Internet URL: <https://www.osa-opn.org/home/articles/volume_27/may_2016/features/space-based_laser_communications_break_threshold>, 11 pgs.

Université de Genève, "Bursting the clouds for better communication", Science Daily | Oct. 2018, retrieved on Apr. 14, 2020 from the Internet URL: <https://www.sciencedaily.com/releases/2018/10/181017111033.htm>, 4 pgs.

Huang, H., et al., Fig 3—uploaded by Huawei Huang—"Envisioned Wireless Big Data Storage for Low-Earth-Orbit Satellite-Based Cloud", Research Gate | Feb. 2013, retrieved on Apr. 14, 2020 from the Internet URL: <https://www.researchgate.net/figure/Typical-flow-models-under-multiple-LEO-satellite-system_fig2_319702988>, 4 pgs.

Huang, H., et al., Fig 1—uploaded by Huawei Huang—"Envisioned Wireless Big Data Storage for Low-Earth-Orbit Satellite-Based Cloud", Research Gate | Feb. 2013, retrieved on Apr. 14, 2020 from the Internet URL: <https://www.researchgate.net/figure/b-A-use-case-under-the-space-based-cloud_fig4_319702988>, 4pgs.

"Why is the life span of a LEO satellite less than that of a GEO satellite?", Stack Exchange | Space Exploration Beta, retrieved on Apr. 14, 2020 from the Internet URL: <https://space.stackexchange.com/questions/1212/why-is-the-life-span-of-a-leo-satellite-less-than-that-of-a-geo-satellite>, 4 pgs.

Huillet, M., "Blockstream Launches 5th Satellite Streaming Bitcoin Blockchain From Space", Cointelegraph | Dec. 2018, retrieved on Apr. 14, 2020 from the Internet URL: <https://cointelegraph.com/news/blockstream-launches-5th-satellite-streaming-bitcoin-blockchain-from-space>, 2 pgs.

Boyle, A., "How satellites and blockchain go together", Geekwire | Space| Feb. 2019, retrieved on Apr. 14, 2020 from the Internet URL: <https://www.geekwire.com/2019/satellites-blockchain-go-together/>, 9 pgs.

TLM, "Blockchains in Space: The Internet of Things Will Run on a LEO Satellite Network", Medium | Feb. 2018, retrieved on Apr. 14, 2020 from the Internet URL: <https://medium.com/@itsTLM/blockchains-in-space-the-internet-of-things-will-run-on-a-leo-satellite-network-e4f606b801d0>, 6 pgs.

Altaf, N., "Space tech: Transforming satellite launches with blockchain", IBM | Blockchain Pulse: IBM Blockchain Blog | Jun. 2019, retrieved on Apr. 14, 2020 from the Internet URL: <https://www.ibm.com/blogs/blockchain/2019/06/space-tech-transforming-satellite-launches-with-blockchain/>, 10 pgs.

"SES Networks Enables Direct Connectivity to IBM Cloud via Global Satellite Network", SES | Oct. 2018, retrieved on Apr. 14, 2020 from the Internet URL: <https://www.ses.com/press-release/ses-networks-enables-direct-connectivity-ibm-cloud-global-satellite-network>, 4 pgs.

* cited by examiner

COORDINATED SMART CONTRACT-BASED SATELLITE MANAGEMENT AND OPERATION

BACKGROUND

Efforts are being made to deploy Low Orbit Earth (LEO) satellite and space-based data center/secure storage to store, access, and protect data while supporting global communications at a reduced latency compared current terrestrial multi-hop networks. One application allows the generation of encryption keys in outer space and their secure transmission to users on Earth via laser or other transmission mediums. In some examples, LEO satellites communicate with geostationary satellites for them to transmit data to and from systems on Earth. LEO satellites sit at a lower altitude above Earth than do geostationary satellites. Geostationary satellites tend to be largely static in their position over Earth, while LEO satellites are not static with respect to geolocation. Some LEO satellites can move at speeds of about 7 kilometers per second relative to a reference point, resulting in an orbit around earth about every 90 minutes.

Radio communication has historically been used for both communications between satellites and for communication between a satellite and an Earth facility. This is being replaced in some applications with laser communication, which can have advantages.

SUMMARY

Shortcomings of the prior art are overcome and additional advantages are provided through the provision of a computer-implemented method. The method obtains terms of smart contracts. The terms are recorded on a blockchain ledger, and the smart contracts govern utilization of a constellation of Earth-orbiting satellites in transmitting data between the constellation of satellites and a collection of ground stations for receiving data transmissions. The collection of satellites form a space-based data center. Different service providers operate different satellites of the constellation of satellites and different ground stations of the collection of ground stations. The smart contracts further govern servicing of requests made between the different service providers. The method also includes operating, by a service provider of the different service providers, one or more satellites of the constellation of satellites pursuant to the smart contracts, and one or more ground stations of the collection of ground stations. The operating includes receiving, by the service provider, a request for data stored on a satellite of the constellation of the satellites. The operating also includes selecting a device to which the satellite is to send the data. The selecting is based on at least one smart contract term defined by one or more of the smart contracts. Additionally, the selecting is a selection made between at least (i) a ground station of the collection of ground stations and (ii) another satellite of the constellation of satellites. The operating further includes initiating sending the data to the selected device by the satellite.

Further, a computer system is provided that includes a memory and a processor in communication with the memory, wherein the computer system is configured to perform a method. The method obtains terms of smart contracts. The terms are recorded on a blockchain ledger, and the smart contracts govern utilization of a constellation of Earth-orbiting satellites in transmitting data between the constellation of satellites and a collection of ground stations for receiving data transmissions. The collection of satellites form a space-based data center. Different service providers operate different satellites of the constellation of satellites and different ground stations of the collection of ground stations. The smart contracts further govern servicing of requests made between the different service providers. The method also includes operating, by a service provider of the different service providers, one or more satellites of the constellation of satellites pursuant to the smart contracts, and one or more ground stations of the collection of ground stations. The operating includes receiving, by the service provider, a request for data stored on a satellite of the constellation of the satellites. The operating also includes selecting a device to which the satellite is to send the data. The selecting is based on at least one smart contract term defined by one or more of the smart contracts. Additionally, the selecting is a selection made between at least (i) a ground station of the collection of ground stations and (ii) another satellite of the constellation of satellites. The operating further includes initiating sending the data to the selected device by the satellite.

Yet further, a computer program product including a computer readable storage medium readable by a processing circuit and storing instructions for execution by the processing circuit is provided for performing a method. The method obtains terms of smart contracts. The terms are recorded on a blockchain ledger, and the smart contracts govern utilization of a constellation of Earth-orbiting satellites in transmitting data between the constellation of satellites and a collection of ground stations for receiving data transmissions. The collection of satellites form a space-based data center. Different service providers operate different satellites of the constellation of satellites and different ground stations of the collection of ground stations. The smart contracts further govern servicing of requests made between the different service providers. The method also includes operating, by a service provider of the different service providers, one or more satellites of the constellation of satellites pursuant to the smart contracts, and one or more ground stations of the collection of ground stations. The operating includes receiving, by the service provider, a request for data stored on a satellite of the constellation of the satellites. The operating also includes selecting a device to which the satellite is to send the data. The selecting is based on at least one smart contract term defined by one or more of the smart contracts. Additionally, the selecting is a selection made between at least (i) a ground station of the collection of ground stations and (ii) another satellite of the constellation of satellites. The operating further includes initiating sending the data to the selected device by the satellite.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the disclosure are apparent from the following detailed description taken in conjunction with the accompanying drawings in which:

DETAILED DESCRIPTION

Figure 1:
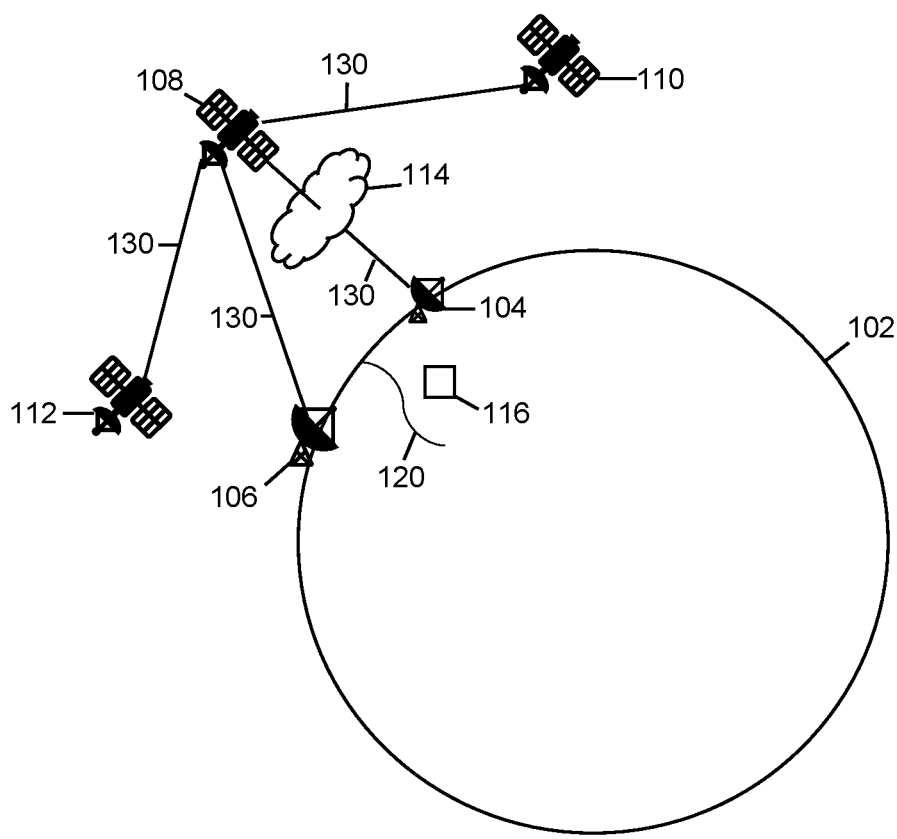
FIG. 1 depicts an example environment to incorporate and use aspects described herein.

Described herein are approaches for coordinated smart contract-based satellite management and operation. While laser-based satellite communication is being explored, atmospheric obstacles such as clouds, fog, pollution, rain or other weather events, and other obstructions can block laser communication between a satellite and a ground receiving station on Earth. Clouds, for example, can block or stop the laser beam(s) from reaching the ground station and/or scramble the transfer of information due to their density. This can cause latency problems and delay the arrival of data from the satellite, perhaps past requirements of applicable service level agreement(s), termed 'SLAs'.

It may be possible to create a temporary hole in a cloud or other atmospheric obstacle, for instance by using an ultra-hot laser. This approach can work for some such obstacles but not all, for instance dense and thick clouds.

LEO satellites are generally used for internet, television, and telephonic communication. Aspects described herein propose LEO satellite use for implementing a space-based data center, together with the coordination and definition of requirements on their use, such as storage space availability, number of satellites, life of satellite, decommissions and/or replacement of satellites, and erasure of data therefrom.

In accordance with additional aspects, a blockchain-based solution is provided that can ensure the trust and completeness of a space-based data center solution involving multiple service providers. At the heart of an example blockchain is a ledger to denote an ordered set of transactions that have been or can be validated or confirmed within the blockchain system up to a certain point in time. For security purposes, the ledger is to include only valid transactions and it should be impossible for any party to remove those transactions once they are committed (i.e., immutability). A distributed ledger is supported by peers in the network, for instance, by having the network peers decide which transactions should be validated by a consensus protocol and/or based on smart contracts that peers or other parties enter into. Thus, a ledger can be developed to account for various types of transactions. The transactions may be based on operations and terms defined by smart contracts, and members may conduct transactions under certain conditions. For example, if a particular computation is performed by one party, then the peers can vote to determine validity of that computation and the corresponding transaction(s). Additionally or alternatively, validation can be automatically performed by a system based on terms of the applicable smart contracts. The ledger in such systems is generally made public and the transactions in it are publicly verifiable. That is, every user, service provider, or other participating entity of the system may be able to obtain the ledger and its transactions, verify that the list of transactions in the ledger are valid, and verify the correctness of the ledger itself.

Methods and systems are provided to facilitate blockchain-powered satellite positioning, launching, operation and management of LEO satellites for a space data center. Satellite communication with ground stations can also be governed by smart contracts of the blockchain network. Selection of communication paths to use in data storage and consumption operations can depend on environmental conditions such as cloud properties, fog/smog, rain and other weather conditions. The terms of the smart contracts can dictate for the system whether and how to transfer data residing at a satellite of a service provider to a destination, for instance whether to (i) create a hole in the cloud or other obstruction, based on properties thereof, or instead (ii) use an alternate ground station, perhaps operated by another service provider, as examples. Smart contracts and blockchain-based validation can provide a robust approach for cross service-provider satellite and ground station coordination for communication to provide a space-based data center in accordance with aspects described herein.

Accordingly, provided are approaches by which a blockchain can ensure management, positioning, launching, and consistent operation of LEO satellites for the space data center. Also provided is a blockchain-based solution for a laser communication system between satellites and ground stations for the space-based data center, with communication routes selected based on environmental conditions.

Ground stations and LEO satellites can be operated by different service providers who participate in the space-based data center network. A service provider could operate one or more satellites and/or one or more ground stations involved. Other parties, not operating satellites or ground stations, could be involved as well. The space-based data center includes satellite-hosted data storage. The data is hosted on satellites above Earth such that data is to be retrieved from an Earth-orbiting satellite to a terrestrial system via a ground station. This can be done in real-time/dynamically when requested and needed. As explained further herein, when a provider desires to retrieve data from a satellite that has an obstructed line of sight to a desired ground station to receive the data, it might be necessary for the satellite to transfer the data (via laser communication, for instance) to another satellite, perhaps operated by a different service provider, for provision to the ground station if a clear line of sight is provided or an obstruction can be overcome, or perhaps to yet another satellite or a different ground station first. Smart contracts can provide terms recorded on a blockchain ledger that can govern utilization of the satellites in transmitting data between them and the ground stations, and more generally governing the relationships between the service providers and the proper actions (contractually obligatory actions) to take in various scenarios given the circumstances under which the data is to be transferred.

In some aspects, one or more service providers obtain terms of smart contracts. The terms can be recorded on a blockchain ledger and the smart contracts can govern, via their terms, utilization of a collection/constellation of Earth-orbiting satellites, such as LEO satellites that form a space-based data center, in transmitting data between the constellation of satellites and ground station(s) for receiving data transmissions. The smart contracts can further govern servicing of requests made between different service providers, and other aspects of the space-based data center. Different service providers can operate different satellites of the constellation of satellites and/or different ground stations of the collection of ground stations. In additional aspects, a service provider operates, pursuant to the smart contracts, one or more satellites, of the constellation, that are under the control of the service provider. The service provider could operate any one or more of the ground stations. Part of that operation can be servicing requests for data as explained in further detail herein.

In one or more aspects, the health condition, available storage space, relative position of each satellite in the constellation of satellites, data communication demand, and other information can be tracked and validated by smart contract rules/terms defined and setup for the space data center system. This can accordingly be used in identifying which satellites are to be replaced, decommissioned, and/or repositioned according to the smart contract terms, which may have been defined to facilitate and satisfy the data communication of space data center.

The blockchain can track the repositioning, launching, and decommissioning of the space data center satellites. This can ensure the space data center is properly managing the satellites, for instance based on data communication demand. Fulfillment and/or deviation from the negotiated service level agreements can thereby be validated.

In some examples, when a satellite, such as an LEO satellite of the constellation, is to be decommissioned because of expiry of service life, then, before grounding the satellite, smart contact terms can be used to identify and enforce whether the data stored on that satellite has been completely erased from the satellite's storage, and the blockchain can track the details about the data erasure grounded. The information can be recorded to the ledger for verification and immutability. When any new satellite is launched for inclusion in the constellation, the blockchain can track how the satellite is positioned among the other satellites of the constellation, the repositioning of other satellites of the constellation to accommodate the new satellite, and how connectivity is established with the other existing satellites. This can ensure that the required data services are provided by the constellation and newly launched satellite. Based on increase in data consumption/demand, satellite(s) can be repositioned, again according to the terms defined in the smart contracts and any applicable rules thereof. Meanwhile, the launching of satellites can be planned and rolled out in light of the increase.

As noted, laser beam communication can be utilized to communicate data between satellites and ground stations. Weather and atmospheric conditions, obstacles, or the like can be a hinderance to this. Smart contract rules and ledger recordation can therefore be used to record and validate the thickness, density, spread, and any other desired characteristics of the obstacle (e.g. cloud, rains, fog, smog, etc.), and identify whether it is possible, feasible and/or expected that a temporary hole be created in the obstacle (e.g. cloud) for the entire data communication session, or whether, instead an alternate route to the receiving ground station (or perhaps a different ground station) is to be used for the data communication. The smart contract terms serve as overriding rules that govern service provider communications between satellites and ground stations. The terms can include terms regarding penetration and transfer of data through obstacles from the satellite hosting the data to a receiving ground station versus hopping the data to other satellite(s) and/or ground station(s), and define the situations where one, the other, or both are acceptable under the smart contracts.

If an obstacle presents itself in the data communication path (e.g. laser beam) while laser beam-based communication of data is in progress, the smart contract rules can dictate whether and when to use an alternate route involving other satellite(s) and/or ground station(s). The blockchain can track and record on the ledger how much data was transferred using direct communication between the satellite and the receiving ground station as well as how much data was transferred via the various satellite(s)/ground station(s) of the alternate route. As different service providers might operate different satellites and ground stations, it can be useful to track how much data was transferred by other service provider(s) on behalf of a first service provider so that the first service provider can properly compensate the other service provider, if there are compensation terms as part of the contracts. The blockchain can track the duration of service availed, amount of data and type of data communication that was transferred between the satellite(s) and ground station(s) operated/owned by the various participating service providers, and accordingly a financial model can be created for satellite-based data center infrastructure usage. Different service providers can place satellites in the constellation for participation in the space-based data center and the blockchain can track which satellite(s) are used in transferring data via the laser or other over-the-air data communication medium, and this recorded data can be used in a costing model for an Infrastructure-as-a-Service offering.

If requested data is present in segments residing in storage on two or more satellites, the data segments can each be sent down from their respective satellite to the closest ground station and then consolidated on a server for sending to the requesting entity.

Based on a smart contract rule, weather prediction results and environmental parameters can be analyzed proactively, and load sharing can be implemented among different ground stations for laser and/or radio beam-based communication with satellites in such a way that the load is shared as desired between participating satellites and ground stations. Load sharing can be important so as to not overload a ground station. Smart contracts can define the terms of a provider temporarily handing-off some of the data send/receive activities from its equipment to the equipment of another service provider to temporarily distribute the workload.

In some examples, mobile ground stations can be deployed. They are mobile in that they are able to autonomously move, or be moved, on-demand and dynamically to desired locations on Earth for purposes of sending/receiving data to/from satellites. Mobility may be useful in situations where a cloud or other obstruction temporarily blocks a line of sight to a satellite. Depending on cloud or other obstacle cover, the station may be able to be moved some distance to obtain a desired line of sight. Weather predictions can also inform whether, when, and where to move the mobile ground stations to avoid obstruction. Thus provided is a capability for proactive, dynamic positioning and repositioning of mobile ground stations based on predicted weather or atmospheric obstructions/obstacles and based further on what data is to be transferred to or from the space-based data center, and when.

Smart contract-based LEO satellite management, positioning and repositioning, coordination, operation, data handling, health, trajectory, and launching, can be controlled and tracked via the blockchain. Satellite parameters (position, health, direction, storage space) and indications of requested data can be processed according to smart contract rules to inform satellite operation in these regards. Terms of the smart contracts as well as tracked information such as satellite actions, events, positioning, etc. are written to the blockchain ledger. The ledger can be written-to by the satellites, ground stations, and/or other servers in space and/or on Earth. Controller computer systems on the satellites and/or on Earth can store rules to implement the smart contract terms. Servers on Earth can control aspects of satellite operation, including satellite movement, and satellite data transfer activities (sending, receiving, forwarding, erasure, etc.).

When a satellite receives a command, for instance to send data to a ground station or a neighboring satellite, to reposition itself, etc., the directive can be written to the ledger, as can a confirmation or verification of the action. Smart contract terms can define what is recorded/verified on the ledger if desired.

While individual participant service providers could enter into two-party private smart contracts, in some embodiments smart contracts with the terms that provide overriding governance on the space-based data center and satellite/ground station operation as described herein can be contracts as between all of the participating providers. The providers then have their own sets of customers who they serve. Data requested by a customer of one provider will be sent to the customer by that provider, though the data may have been securely passed through satellite(s) and/or ground station(s) of one or more other provider on its way.

Details of the smart contracts (e.g. terms, duration, etc.) can be written into the ledger, which can be passed around to multiple peers, for instance terrestrial servers of different service providers.

Assume a first provider contacts a second provider indicating that a set of specific data is needed at a specific time later in the day. The first provider may do this if the first provider predicts that transfer from the provider's satellite to a desired ground station (such as the provider's own ground station) will be hindered by a weather or other atmospheric condition at that time of day. The first and second providers can communicate with each other via terrestrial servers and/or their satellite equipment to arrange for inter-provider data communication. Smart contract rules could dictate the terms of that data transfer. At the specific time of day, each provide can direct its satellite and other equipment to send/receive the requested data in accordance with those rules and as agreed upon by the providers. Since customers of the providers might have service level agreements (SLAs) applicable to data retrieval, this can factor into the operations needed by the various providers involved in the data transfer, and that can affect what specific actions are taken at the requested time.

FIG. 1 depicts an example environment to incorporate and use aspects described herein. The environment includes Earth 102, ground stations 104 and 106 residing on Earth, and a constellation of satellites 108, 110, 112. Ground stations communicate with the satellites to send and receive data. Communication between satellites and/or ground stations takes place across communications links 130. Communications links 130 are, in this example, wireless communications links/connections. Example wireless connections include radio, laser, and cellular-based links. More generally, communications links 130 may be any appropriate wireless and/or wired communication links for communicating data. FIG. 1 presents a relatively simplified embodiment with only two ground stations and only three satellites. In practical embodiments, there may be any number of ground stations and satellites involved.

Ground stations 104 and 106 may be operated by the same or different service providers, as could satellites 108, 110 and 112. Shown also in FIG. 1 is an obstacle 114, in this case a cloud, such that satellite 108 and ground station 104 may be unable to communicate with each other at the time that this cloud remains interposed between them. The blockchain can capture parameters of cloud 114 (size, density, etc.) and can also track whether/how communication it affects communication between any sets of satellites and ground stations. For instance, if satellite 108 is unable to communicate with ground station 104 at this point in time, the blockchain can record that fact, or at least data that indicates that fact. It can also track the obstacle's movement, which devices that affects in terms of communicating with other devices, and the extent to which different service providers' infrastructures are used as a service to transfer data on behalf of other providers.

Satellites 108, 110, 112 are LEO satellites in this example. Though not shown, one or more geostatic/geostationary satellites may also be present such that one or more of the LEO satellites can communicate with geostationary satellite(s) for transferring data to Earth or another satellite of the space-based data center.

The provider satellites can work together pursuant to the terms of the smart contracts in order to send/receive data, such as provider customer data, to/from each other. This may be done in some examples due to an obstruction between a satellite hosting desired data and a ground station.

Assume in FIG. 1 that a provider operates satellite 108 and ground station 104, and that a customer (represented by computer system 116) of the provider requests data that is hosted on satellite 108. The ground station nearest satellite 108 is station 104, however cloud 114 obstructs the communication path between satellite 108 and ground station 104. In some cases, it may be possible to bore a hole through cloud 114 and/or use a sufficiently strong laser to effectively communicate the data through cloud 114. In other cases, this may not be possible. Consequently, the satellite 108, being operated in accordance with the smart contracts applicable to the space-based data center, might send the data to satellite 112, which may or may not be operated by a different provider. Satellite 112 has a line of sight to ground station 104 in this example, however it may be desired to send the data instead to ground station 106 for subsequent terrestrial transfer to system 116.

Alternatively, satellite 110, which may or may not be operated by the same provider, could be used to effect a transfer of the data to ground station 104.

Since different service providers may operate the different satellites and/or ground stations, there may be differing costs associated with the different possible paths for data to be sent from satellite 108 to system 116. When data is sent from the source satellite through intermediary device(s), this can be done in such a way to minimize storage of the data on the intermediary device for any prolonged amount of time. This can be done for privacy and security reasons. The data can be sent in encrypted form for example. Handling of the data, including erasure of any received and transferred data, can be tracked on the ledger.

Accordingly, an example process of a service provider operating satellites as discussed herein includes receiving a request (e.g. from a customer or other requesting entity) for data stored on a satellite of a constellation of the satellites, and selecting a device to which that satellite is to directly send the data (i.e. device receiving the data from the satellite, as opposed to an intervening satellite or ground station). The selection can be based, at least in part, on smart contract term(s) defined by smart contract(s) and can be made as between a ground station of a collection of ground stations and another satellite of the constellation of satellites.

In this regard, the request for data on satellite 108 in FIG. 8 may prompt a consideration as to whether the data is to be sent directly to ground station 104 by satellite 108 (if possible through cloud obstruction 114), or instead is to be sent to satellite 110 or 112 for subsequent transmission to either ground station 106 or 104. Additionally or alternatively, there may be other reasons to hop the data to another satellite 108 or 112—load balancing, jurisdictional concerns, or other as described herein.

In any case, once selected, the process can initiate sending of that data to the selected device by the satellite, and record to the blockchain the action(s) taken by the satellite in responding to the request.

The selection of the device to which to transfer the data can include determining between (i) transmitting the data from the satellite directly to the ground station (e.g. 104) and (ii) transferring the data to the another satellite (e.g. 110, 112). The blockchain ledger can record presence of atmospheric obstacles to data transmission from the satellite and the ability of the satellite to transmit data to various ground stations of the collection of ground stations based on the presence of atmospheric obstacles and pursuant to smart contract term(s). The determination as between (i) and (ii) above can therefore be based on whether an atmospheric obstacle to transmitting the data to the ground station is present at a time that the data is to be sent by the satellite. The atmospheric obstacle can be a cloud (as in FIG. 1) between the satellite and the ground stations, and the determining can be further based on a determination of whether a hole can be created in the cloud to enable sending the data from the satellite (108) through the cloud (114) to the ground station (104).

As noted, the selected satellite or ground station to which the data is to be transferred from satellite 108 might be operated by another service provider. The process can record to the blockchain ledger financial information related to that other service provider's contributions to servicing the request for the data. Example such financial information can indicate a duration of time which the other service provider contributed to servicing the request, an amount of data transmitted via the other providers' device(s) in contributing to servicing the request, and/or a type of data communication performed by the other provider's device(s) in contributing to servicing the request.

The selection can be further based on a smart contract term dictating load sharing that is to be followed by the constellation of satellites and the collection of ground stations in transmitting data therebetween. In this manner, the smart contracts could contemplate a load sharing scheme by which data transmissions are load-balanced, particularly during times of heavy demand. Even if no obstructions to communication to a nearest ground station are present, it might be desired, according to the terms in the smart contracts, for a satellite to hop the data to another satellite and/or other ground station to help balance the overall workload among the satellites and/or ground stations.

Some smart contract term(s) could indicate constraints on transferring data across terrestrial jurisdictional boundaries. The jurisdictional boundaries could be borders of countries, regions, states, or the like, or any other type of boundary between two distinct jurisdictions. 'Jurisdiction' could be used in the legal or territorial sense, though more generally it can refer to any applicable rules, regulations, laws, domains, practices, etc. dictating the storage, deletion, transmission, protection and/or handling of data and potentially affecting the ability two transfer between jurisdictions.

Thus, the selection of the device to which to transfer the data can consider whether a downstream transfer of the data across a jurisdictional boundary of the terrestrial jurisdictional boundaries would result from selecting any of the devices being considered, for instance the ground station or satellite between which the selection is being made, and any other satellites in the constellation and/or other ground stations of the collection of ground stations. In other words, the decision whether to send to the data to, e.g., a nearby ground station directly or hop it to another satellite first can consider whether sending it to any of various different devices is expected to result in the data being eventually (downstream) transferred across a border or other jurisdictional boundary. If so, this may present a problem.

Referring to FIG. 1, assume that provider 1 operates ground station 104, satellite 108 that stores requested data, and satellite 112, while provider 2 operates satellite 110. The requested data on satellite 108 is to be provided to system 116 but cloud 114 is obstructing satellite 108's communication path to ground station 104. On the one hand, provider 1 might be inclined to transfer the data to its other satellite 112 and then down to ground station 106. However, jurisdictional boundary 120 exists between ground station 106 and system 116. The boundary may be such that data transfer across the boundary (i.e. from 106 to 116, perhaps through other systems along the way) is illegal or undesirable for any other reason. On the other hand, provider 1 could select to transfer the data to satellite 110, which has an unobstructed communication path to ground station 104. The advantage is that this would avoid the cross-boundary transfer of data since the data would be provided directly to ground station 104 in the territory in which system 116 sits. The downside is that it may be more costly for provider 1, as the data would flow through provider 2's satellite (likely at an added cost) in that scenario, rather than flowing through provider 1's own alternative satellite 112.

In another scenario, if satellite 108 has an unobstructed view to another ground station within the territory of system 116, the another ground station operated by provider 2, it may be possible for satellite 108 to send the data to that ground station for transfer to system 116.

As discussed briefly above, mobile ground stations can factor into decisions when jurisdictional boundaries are involved. Referring to FIG. 1, assume that provider 2's satellite 110 stores data that is to be transferred into the territory of system 116 but that provider 2 does not want to pay the cost associated with transferring the data down to ground station 104 operated by provider 1. Assume also ground station 106 is a mobile ground station operated by provider 2. Provider 2 could direct its mobile ground station 106 to cross the jurisdictional boundary 120 into the territory with ground station 104 and system 116. Provider 2's satellite 110 could then transfer the data down to provider 2's mobile ground station 106 in the proper territory.

Additional aspects of provider operation of satellite(s) includes the launching and positioning of operated satellites. The smart contracts can govern the addition of satellites to, and removal of satellites from, the constellation of satellites, as well as protocols for launching and positioning of satellites of the constellation of satellites. The blockchain ledger can record positioning of each satellite of the constellation of satellites.

A service provider can add a satellite to the constellation of satellites pursuant to a smart contract term which indicates a proper position for the added satellite in the constellation. Smart contract terms can also govern how connectivity of the added satellite is to be established with other satellites in the constellation of satellites. Communication protocols, timing, and other specifications can be selected or defined in the smart contacts to ensure that interoperability of the satellites in this regard.

Operating a satellite can also include the service provider repositioning a satellite pursuant to a smart contract term for accommodating an added satellite that is added to the constellation of satellites. In this regard, the positioning of satellites in a constellation can be very important and when a constellation is expanded with the addition of one or more satellites, for instance based on increase in demand, then it may be necessary for the overall benefit of the space-based data center to reposition existing satellites in the constellation to accommodate the added satellite(s).

Satellites may also need to be decommissioned according to smart contract terms. The blockchain ledger records satellite information, parameters, characteristics, and the like, including, as examples, health condition, life expectancy, available storage space, load, positioning, and direction of movement of each satellite of the constellation of satellites. The blockchain can also validate the satellite information against at least some of the terms of the smart contracts. The operation of a satellite by a service provider can therefore include identifying which of the one or more satellites operated by the service provider are to be decommissioned or repositioned to satisfy requirements under the smart contracts.

The following present some example implementation steps, processes, or other activities in accordance with aspects described herein. Each LEO satellite can be identified uniquely, and their relative positions can be identified in low Earth orbit and recorded on the ledger. Their positions in low Earth orbit can change (which will be tracked on the ledger), as LEO orbits generally are not as geostatic as positions of geostationary satellites. Based on defined smart contract rule(s), the LEO satellite positioning can be tracked on defined time intervals, meaning that their position can be polled on interval/periodic basis, say every two minutes for instance. The results can be tracked on ledger.

Demand for data from the space-based data center can be identified. This demand refers to not only specific and actual data consumption demand measured in real time but also predicted demand based on historical patterns. Based on the data consumption demand, smart contract rule(s) can identify the relative positions of satellites in the constellation and accordingly, based on smart contract rule(s), could steer the LEO satellites by directing providers to operate their satellites to reposition/steer them. As satellites are repositioned based on smart contract rule(s), then the blockchain can track how the satellites respond and whether they properly reposition. The repositioning of the satellites, including the positions to which they are steered, can be dictated by data consumption demand. If it is known that there is or will be significant demand in a particular region, it may be useful to add and/or reposition satellites over that region to help service the workload in moving data to/from ground station(s) in that region.

Each LEO satellite can have a self-health check mechanism, and an 'Internet-of-Things' (IoT) enabled system can validate the health condition of each of the satellites. This can help in determining expected life of the LEO satellite and can be recorded on ledger. Accordingly, the blockchain can tracking the expected life of each LEO satellite, their relative position, direction of movement, etc. with specific time values. The smart contract(s) can be used in validating the health condition of the satellites and determining satellite life expectancy. If the satellite is nearing end-of-life, smart contract rule(s) can dictate planning for new satellite launch, and ground management can be informed. If a satellite is planned to be decommissioned, a smart contract rule can identify the satellite, and initiate data erasure from the satellite to be grounded. The blockchain can track the data erasure by the satellite to be decommissioned. The blockchain can thereby track end-to-end lifecycle (launch to decommission) of each LEO satellite and its involvement in data center activities. When a satellite is decommissioned, a smart contract rule ensures proper positioning of that satellite, offload and erasure of that satellite's stored data, and offload of any load sharing that is occurring, and the blockchain can track this. Decommission might also prompt the repositioning of remaining satellites in the constellation.

In addition, one or more LEO satellites of the constellation may, at times, not participate in the data center support—that is, may temporarily not be actually servicing data requests. This can be based on the demand of data consumption and storage. Smart contract rule(s) can dictate when to bring satellites in and move satellites out of the pool of satellites satisfying data consumption demand (servicing the requests for data). Smart contracts can for instance set specifications for demand thresholds to add or remove satellites.

Based on capabilities of laser beam communication, aspects can identify properties (thickness, density, spread, etc.) of weather or other atmospheric obstacles to laser-based data communication. Satellite images and weather forecast data, as examples can be used for identifying some of these properties. The terms of the contracts can specify what properties are to be regarded as prohibitive of laser-based data communication, and conversely what properties warrant an attempt to create a temporary hole in the obstacle and transfer the data.

Each of the ground stations can be identified uniquely and position identified and tracked (as mobile ground stations may change position). The ground stations could also be involved in validating status of any obstacles in the sky and share that information in the ledger of the blockchain. This can help to identify which ground station can perform direct communication with which satellites at given times. The blockchain can track the availability of the ground stations in terms of which stations can communicate with which satellites using laser beam-based communication, as opposed to which may experience problems due to obstacles. Aspects can also predict the availability of ground stations to various satellites based on predicted weather conditions or other potential obstacles to communication, and distribute the load among the different ground stations accordingly. It can identify based on properties of obstacles the timing of obstructions, how long it will last, when the obstruction will clear, etc., and determine based on that information how much infrastructure to use now or at a future time to ensure data communication is achieved in a desired amount of time or at a desired maximum cost.

When data communication is attempted between a ground station and a satellite, smart contract rule(s) can be used to validate whether the communication can be established, and, accordingly, the communication can be performed either using that ground station or another ground station if necessary. The blockchain can capture how long any given ground station's infrastructure is used for data communication on behalf of a provider, in addition to how much space is consumed on satellites, how much data was transferred, and other information to facilitate compensation arrangement between providers.

Figure 2:
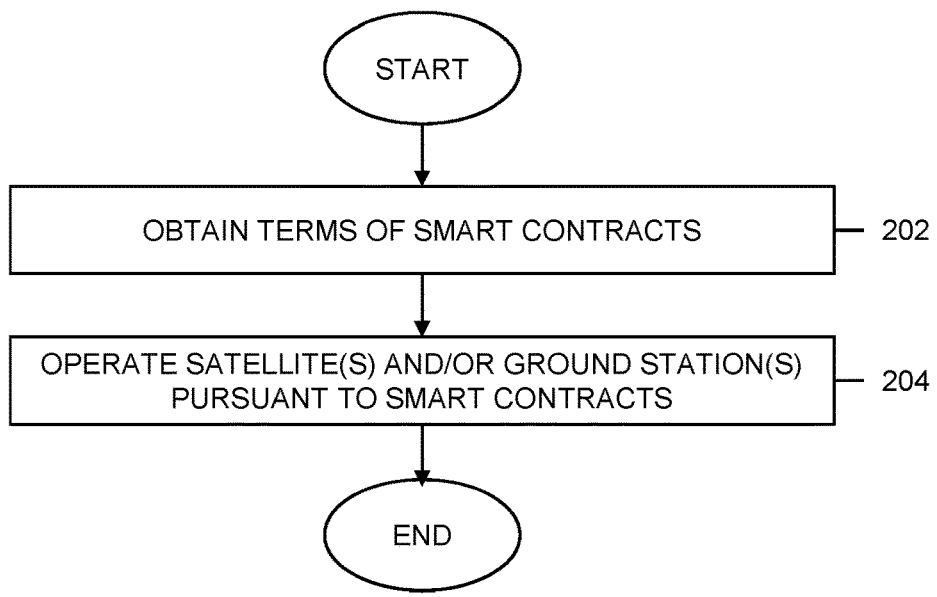
FIG. 2 depicts an example process for coordinated smart contract-based satellite management and operation, in accordance with aspects described herein

FIG. 2 depicts an example process for coordinated smart contract-based satellite management and operation, in accordance with aspects described herein. In some examples, the process is performed by one or more computer systems, such as those described herein, which may include one or more computer systems of a service provider, such as one or more computer systems of or connected to a satellite or ground station, one or more cloud servers, and/or one or more other computer systems/servers.

The process of FIG. 2 may be from the perspective of a specific service provider. The process obtains (202) terms of smart contracts. The terms are recorded on a blockchain ledger and the smart contracts govern utilization of a constellation of Earth-orbiting satellites, which form a space-based data center, in transmitting data between the constellation of satellites and a collection of ground stations for receiving data transmissions. Different service providers operate different satellites of the constellation of satellites and different ground stations of the collection of ground stations, and the smart contracts further govern servicing of requests (e.g. requests for data transfer/forwarding) made between the different service providers.

The process of FIG. 2 also includes the service provider operating (204) any one or more satellites, of the constellation of satellites, that the service provider controls pursuant to the smart contracts, i.e. terms thereof, and any one or more ground stations, of the collection of ground stations, that the service provider controls.

Figure 3A:
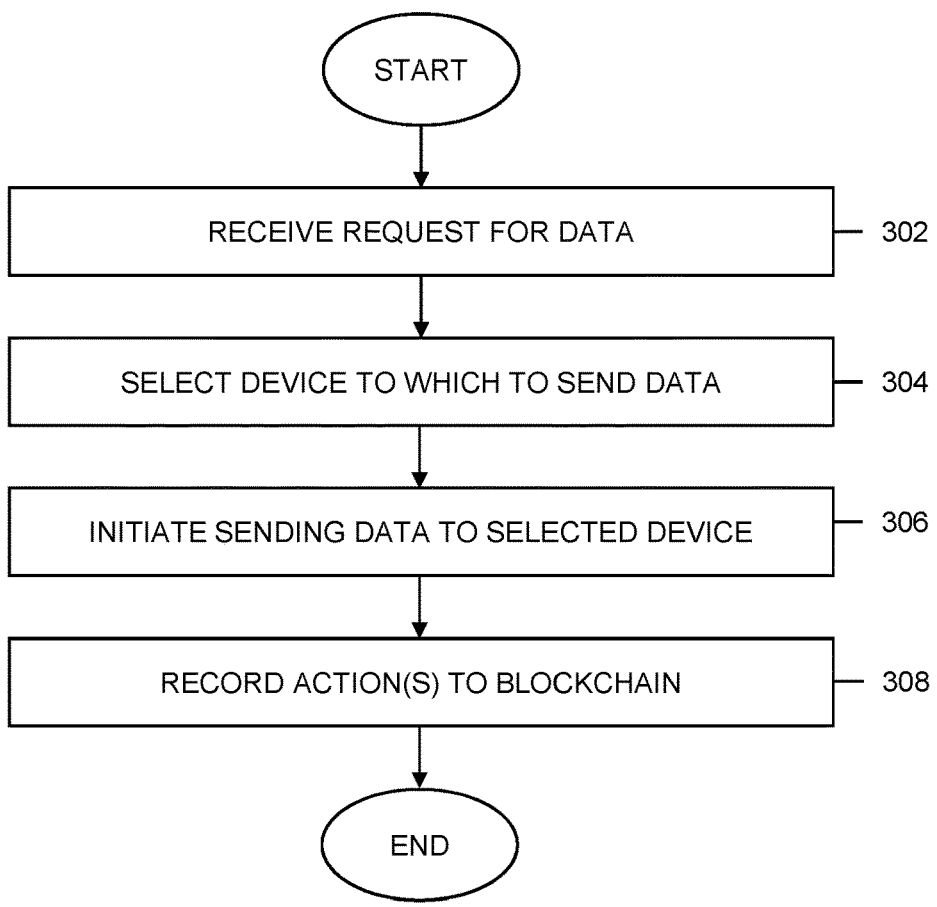
FIG. 3A depicts an example process for satellite/ground station operation in servicing a data request in a space-based data center, in accordance with aspects described herein.

FIG. 3A depicts an example process for satellite/ground station operation in servicing a data request in a space-based data center, in accordance with aspects described herein. The process may be performed by a computer system of, or in communication with, a satellite or ground station, for instance. The process includes the service provider receiving (302) a request for data stored on a satellite of the constellation of the satellites. The process then selects (304) a device to which the satellite is to send the data. The selecting is based on at least one smart contract term defined by one or more of the smart contracts, and the selecting is a selection made between at least a ground station of the collection of ground stations and another satellite of the constellation of satellites, as possibilities of a device to which to send the data. In this regard, a consideration may be whether the data it to be sent by the satellite directly down to a ground station or instead should hop to another satellite.

Many different reasons may exist for first hopping the data to another of the satellites. In some examples, the selecting includes determining between transmitting the data from the satellite directly to the ground station and transferring the data to the another satellite, where the blockchain ledger records presence of atmospheric obstacles, (such as clouds, weather, or other atmospheric obstructions) to data transmission from the satellite and the ability of the satellite to transmit data to various ground stations of the collection of ground stations based on the presence of atmospheric obstacles and pursuant to the at least one smart contract term. The determining can be based on whether an atmospheric obstacle to transmitting the data to the ground station is present at a time that the data is to be sent by the satellite. In specific examples, the atmospheric obstacle is a cloud between the satellite and the ground stations, and the determination where to send the data is further based on a determination whether a hole can be created in the cloud to enable sending the data from the satellite through the cloud to the ground station.

The selected device can be a selected satellite, of the constellation of satellites, or a selected ground station, of the collection of ground stations. In either case, the selected satellite or ground station could be operated by another service provider of the different service providers. The method could further include recording to the blockchain ledger financial information related to the another service provider contributing to servicing the request for the data (i.e. helping to transfer the data to a target recipient. The financial information can indicate a duration of time which the another service provider contributed to servicing the request, an amount of data transmitted via the selected device in contributing to servicing the request, and/or a type of data communication performed by the selected device in contributing to servicing the request, as these may be factors in the fees that the another service provider charges or is entitled to under terms of the smart contracts.

The selecting of the device can be further based on a term that dictates load sharing that is to be followed by the constellation of satellites and the collection of ground stations in transmitting data therebetween.

Additionally or alternatively, at least one smart contract term indicates constraints on transferring data across terrestrial jurisdictional boundaries, and the selecting considers whether a downstream transfer of the data across a jurisdictional boundary of the terrestrial jurisdictional boundaries would result from selecting: the ground station, the another satellite, one or more other ground stations of the collection of ground stations, and/or one or more other satellites of the constellation of satellites. In this regard, the decision whether to send to a ground station directly or hop the data to another satellite first can consider whether sending it to any of various different devices is expected to result in the data being eventually (downstream) transferred across a border or other jurisdictional boundary. If so, this can be recognized as a problem and can will inform at least where the data should not be sent, and in turn inform which device(s) are potential device to receive the data, and where to actually send the data.

In any case, the process of FIG. 3A continues by initiating sending (306) of the data to the selected device by the satellite, and recording (308) to the blockchain actions taken by the satellite in responding to the request. The 'actions' can encompass also any relevant information, such as information about how the satellite handled the request, which device it selected to send the data to, information/date relied upon in making the determination to which device to send the requested data, and/or any other information desired.

Figure 3B:
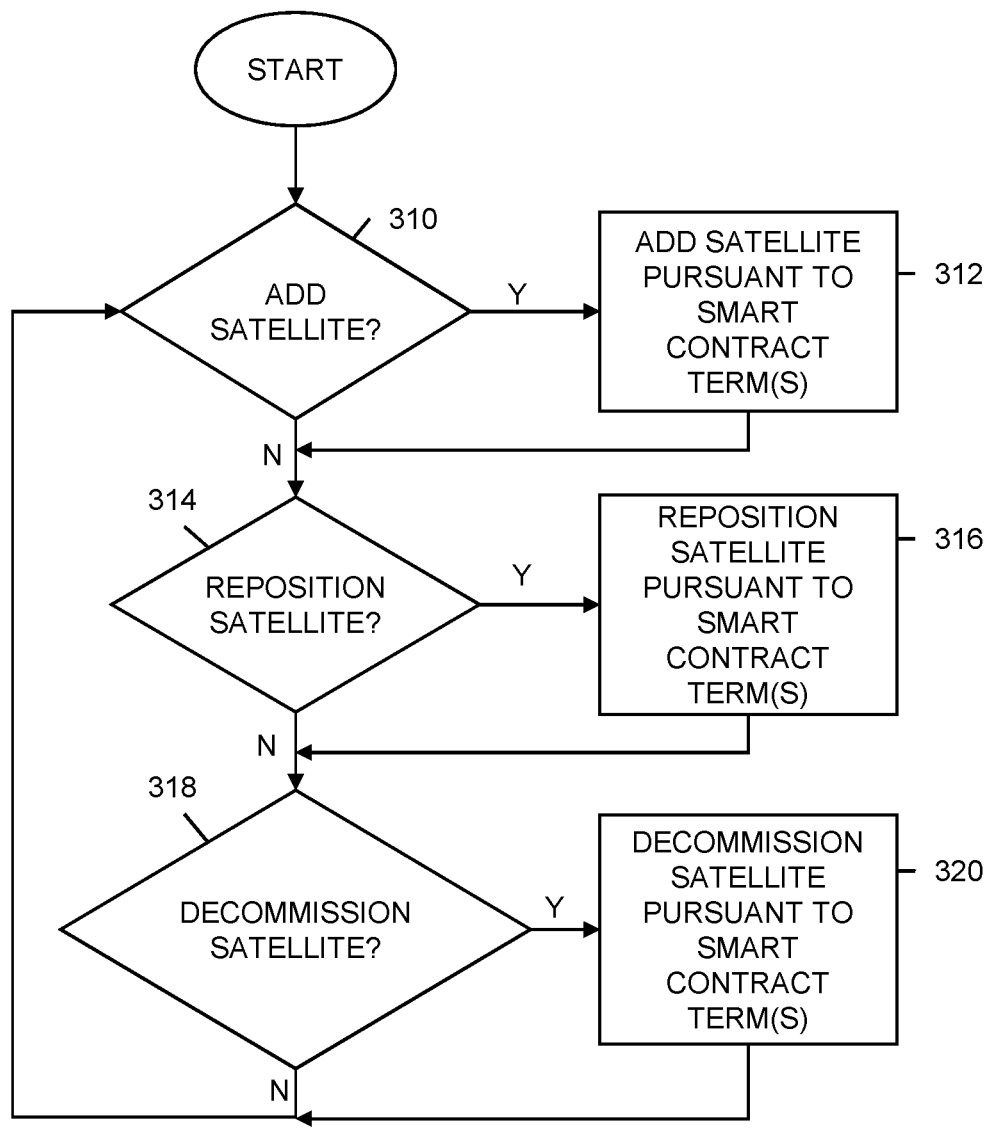
FIG. 3B depicts an example process for satellite addition, positioning, and decommissioning, in accordance with aspects described herein.

FIG. 3B depicts an example process for satellite addition, positioning, and decommissioning, in accordance with aspects described herein. The smart contracts can further govern addition of satellites to, and removal of satellites from, the constellation of satellites, and protocols for launching and positioning of satellites of the constellation of satellites. The blockchain ledger can record positioning of each satellite of the constellation of satellites. The process of FIG. 3B proceeds through some determinations/actions that a service provider might undertake in operating satellite(s)/ground station(s). Thus, the process can include the service provider determining (310) whether to add a satellite to the constellation of satellites pursuant to a smart contract term. If so (310, Y), the process adds (312) the satellite to the constellation of satellites pursuant to the smart contract term. The smart contract rule can also indicate a proper position (or define rules to determine a proper position) for the added satellite in the constellation. A smart contract term, defined by a smart contract of the smart contracts, can govern how connectivity of the added satellite is to be established with other satellites in the constellation of satellites.

Otherwise (310, N), or at some other point in the process, the process determines (314) whether to reposition a satellite of the one or more satellites operated by the service provider. If so, (314, Y) the process repositions (316) the satellite pursuant to a smart contract term, defined by a smart contract of the smart contracts, for accommodating an added satellite that is added to the constellation of satellites.

Otherwise (314, N), or at some other point in the process, the process determines (318) whether to decommission a satellite of the one or more satellites operated by the service provider. The blockchain ledger can records satellite information including health condition, life expectancy, available storage space, load, positioning, and direction of movement of each satellite of the constellation of satellites, and validate the satellite information against at least some of the terms of the smart contracts. The service provider might identify which of the one or more satellites operated by the service provider are to be decommissioned or repositioned to satisfy requirements under the smart contracts. If it is determined at 318 to decommission a satellite (314, Y), the process decommissions (320) the satellite pursuant to a smart contract term, defined by a smart contract of the smart contracts, for decommissioning the satellite.

Although various examples are provided, variations are possible without departing from a spirit of the claimed aspects.

Figure 4:
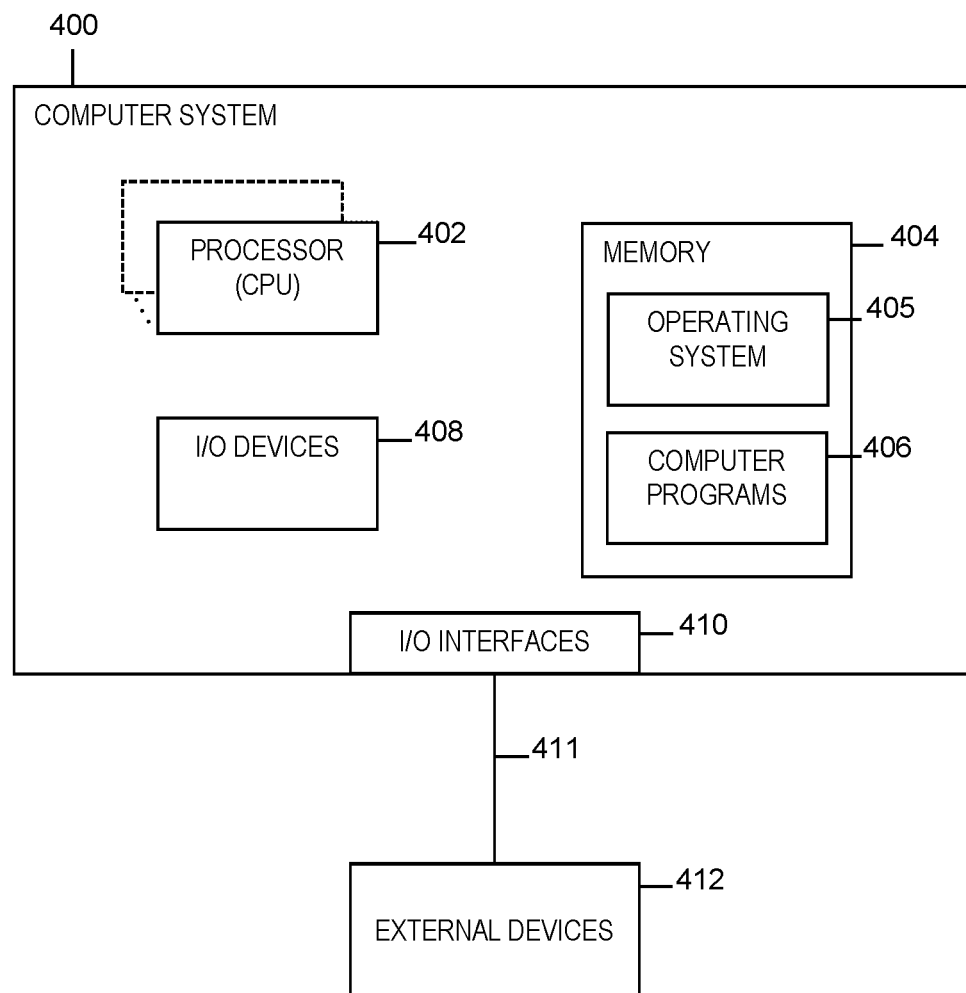
FIG. 4 depicts one example of a computer system and associated devices to incorporate and/or use aspects described herein.

Processes described herein may be performed singly or collectively by one or more computer systems. The computer system(s) could be those on/of satellites, ground stations, or other terrestrial servers/systems, for instance controllers or other computers used in operating and controlling satellites and/or ground stations, for instance. FIG. 4 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, N.Y., USA), Intel Corporation (Santa Clara, Calif., USA) or ARM Holdings plc (Cambridge, England, United Kingdom), as examples.

FIG. 4 shows a computer system 400 in communication with external device(s) 412. Computer system 400 includes one or more processor(s) 402, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 402 can also include register(s) to be used by one or more of the functional components. Computer system 400 also includes memory 404, input/output (I/O) devices 408, and I/O interfaces 410, which may be coupled to processor(s) 402 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 404 can be or include main or system memory (e.g. Random Access Memory) used in the execution of program instructions, storage device(s) such as hard drive(s), flash media, or optical media as examples, and/or cache memory, as examples. Memory 404 can include, for instance, a cache, such as a shared cache, which may be coupled to local caches (examples include L1 cache, L2 cache, etc.) of processor(s) 402. Additionally, memory 404 may be or include at least one computer program product having a set (e.g., at least one) of program modules, instructions, code or the like that is/are configured to carry out functions of embodiments described herein when executed by one or more processors.

Memory 404 can store an operating system 405 and other computer programs 406, such as one or more computer programs/applications that execute to perform aspects described herein. Specifically, programs/applications can include computer readable program instructions that may be configured to carry out functions of embodiments of aspects described herein.

Examples of I/O devices 408 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (412) coupled to the computer system through one or more I/O interfaces 410.

Computer system 400 may communicate with one or more external devices 412 via one or more I/O interfaces 410. Example external devices include a keyboard, a pointing device, a display, and/or any other devices that enable a user to interact with computer system 400. Other example external devices include any device that enables computer system 400 to communicate with one or more other computing systems or peripheral devices such as a printer. A network interface/adapter is an example I/O interface that enables computer system 400 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 410 and external devices 412 can occur across wired and/or wireless communications link(s) 411, such as Ethernet-based wired or wireless connections. Example wireless connections include cellular, Wi-Fi, Bluetooth®, proximity-based, near-field, laser-based or other types of wireless connections. More generally, communications link(s) 411 may be any appropriate wireless and/or wired communication link(s) for communicating data.

Particular external device(s) 412 may include one or more data storage devices, which may store one or more programs, one or more computer readable program instructions, and/or data, etc. Computer system 400 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 400 may be operational with numerous other general purpose or special purpose computing system environments or configurations. Computer system 400 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
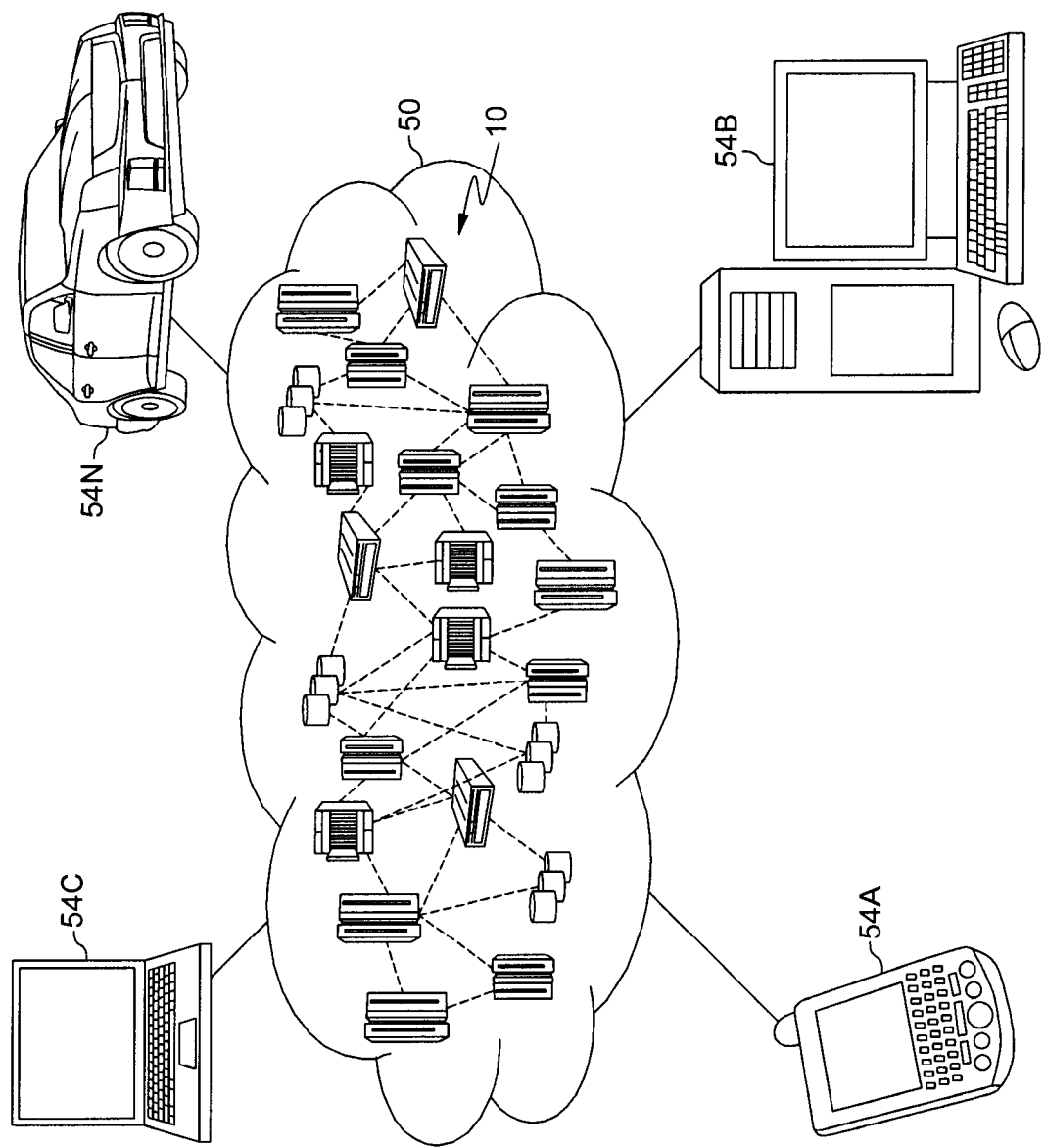
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
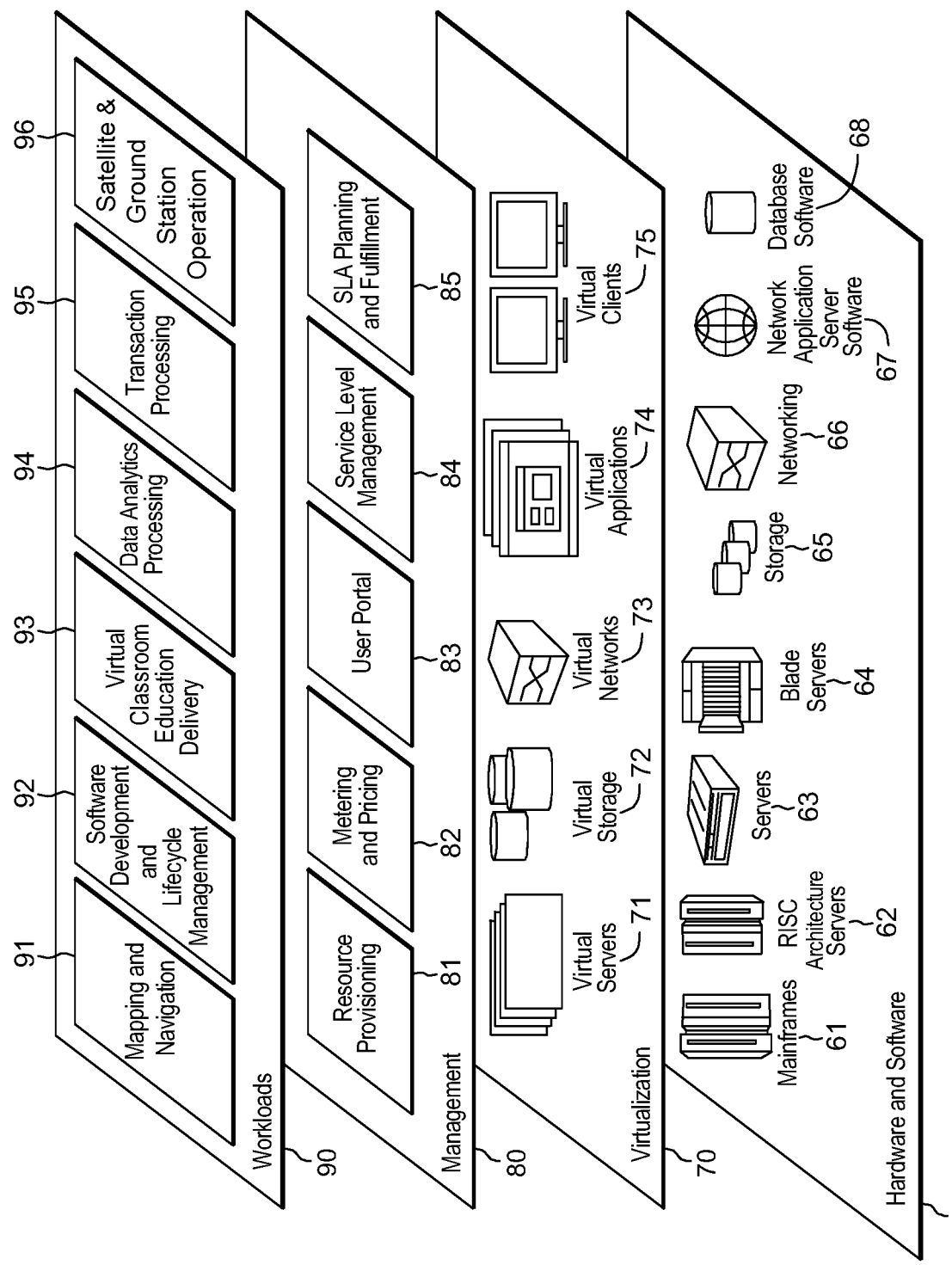
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and satellite/ground station operation 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
   obtaining terms of smart contracts, the terms being recorded on a blockchain ledger, the smart contracts governing utilization of a constellation of Earth-orbiting satellites, which form a space-based data center, in transmitting data between the constellation of satellites and a collection of ground stations for receiving data transmissions, wherein different service providers operate different satellites of the constellation of satellites and different ground stations of the collection of ground stations, and wherein the smart contracts further govern servicing of requests made between the different service providers; and
   operating, by a service provider of the different service providers, one or more satellites of the constellation of satellites pursuant to the smart contracts, and one or more ground stations of the collection of ground stations, the operating comprising:

receiving, by the service provider, a request for data stored on a satellite of the constellation of the satellites;

selecting a device to which the satellite is to send the data, the selecting being based on at least one smart contract term defined by one or more of the smart contracts, and the selecting being a selection made between at least (i) a ground station of the collection of ground stations and (ii) another satellite of the constellation of satellites; and initiating sending the data to the selected device by the satellite.

2. The method of claim 1, wherein the selecting comprises determining between transmitting the data from the satellite directly to the ground station and transferring the data to the another satellite, wherein the blockchain ledger records presence of atmospheric obstacles to data transmission from the satellite and the ability of the satellite to transmit data to various ground stations of the collection of ground stations based on the presence of atmospheric obstacles and pursuant to the at least one smart contract term, and wherein the determining is based on whether an atmospheric obstacle to transmitting the data to the ground station is present at a time that the data is to be sent by the satellite.

3. The method of claim 2, wherein the atmospheric obstacle is a cloud between the satellite and the ground stations, and wherein the determining is further based on a determination whether a hole can be created in the cloud to enable sending the data from the satellite through the cloud to the ground station.

4. The method of claim 1, wherein the at least one smart contract term indicates constraints on transferring data across terrestrial jurisdictional boundaries, wherein the selecting considers whether a downstream transfer of the data across a jurisdictional boundary of the terrestrial jurisdictional boundaries would result from selecting at least one of the group consisting of: the ground station, the another satellite, one or more other ground stations of the collection of ground stations, and one or more other satellites of the constellation of satellites.

5. The method of claim 1, further comprising recording to the blockchain actions taken by the satellite in responding to the request.

6. The method of claim 1, wherein the smart contracts further govern addition of satellites to, and removal of satellites from, the constellation of satellites, and protocols for launching and positioning of satellites of the constellation of satellites, wherein the blockchain ledger records positioning of each satellite of the constellation of satellites.

7. The method of claim 6, wherein the operating further comprises the service provider adding a satellite to the constellation of satellites pursuant to a smart contract term defined by a smart contract of the smart contracts and indicating a proper position for the added satellite in the constellation.

8. The method of claim 7, wherein a smart contract term, defined by a smart contract of the smart contracts, governs how connectivity of the added satellite is to be established with other satellites in the constellation of satellites.

9. The method of claim 6, wherein the operating further comprises the service provider repositioning a satellite, of the one or more satellites operated by the service provider, pursuant to a smart contract term, defined by a smart contract of the smart contracts, for accommodating an added satellite that is added to the constellation of satellites.

10. The method of claim 1, wherein the selected device comprises (i) a selected satellite, of the constellation of satellites, or (i) a selected ground station, of the collection of ground stations, the selected satellite or ground station being operated by another service provider of the different service providers, wherein the method further comprises recording to the blockchain ledger financial information related to the another service provider contributing to servicing the request for the data, the financial information indicating at least one selected from the group consisting of: a duration of time which the another service provider contributed to servicing the request, an amount of data transmitted via the selected device in contributing to servicing the request, and a type of data communication performed by the selected device in contributing to servicing the request.

11. The method of claim 1, wherein the selecting is further based on a term, of the at least one term, dictating load sharing that is to be followed by the constellation of satellites and the collection of ground stations in transmitting data therebetween.

12. The method of claim 1, wherein the blockchain ledger records satellite information including health condition, life expectancy, available storage space, load, positioning, and direction of movement of each satellite of the constellation of satellites, and validates the satellite information against at least some of the terms of the smart contracts, and wherein the operating further comprises the service provider identifying which of the one or more satellites operated by the service provider are to be decommissioned or repositioned to satisfy requirements under the smart contracts.

13. A computer system comprising:
a memory; and
a processor in communication with the memory, wherein the computer system is configured to perform a method comprising:
obtaining terms of smart contracts, the terms being recorded on a blockchain ledger, the smart contracts governing utilization of a constellation of Earth-orbiting satellites, which form a space-based data center, in transmitting data between the constellation of satellites and a collection of ground stations for receiving data transmissions, wherein different service providers operate different satellites of the constellation of satellites and different ground stations of the collection of ground stations, and wherein the smart contracts further govern servicing of requests made between the different service providers; and
operating, by a service provider of the different service providers, one or more satellites of the constellation of satellites pursuant to the smart contracts, and one or more ground stations of the collection of ground stations, the operating comprising:
receiving, by the service provider, a request for data stored on a satellite of the constellation of the satellites;
selecting a device to which the satellite is to send the data, the selecting being based on at least one smart contract term defined by one or more of the smart contracts, and the selecting being a selection made between at least (i) a ground station of the collection of ground stations and (ii) another satellite of the constellation of satellites; and
initiating sending the data to the selected device by the satellite.

14. The computer system of claim 13, wherein the selecting comprises determining between transmitting the data from the satellite directly to the ground station and transferring the data to the another satellite, wherein the blockchain ledger records presence of atmospheric obstacles to data transmission from the satellite and the ability of the satellite to transmit data to various ground stations of the collection of ground stations based on the presence of atmospheric obstacles and pursuant to the at least one smart contract term, and wherein the determining is based on whether an atmospheric obstacle to transmitting the data to the ground station is present at a time that the data is to be sent by the satellite, wherein the atmospheric obstacle is a cloud between the satellite and the ground stations, and wherein the determining is further based on a determination whether a hole can be created in the cloud to enable sending the data from the satellite through the cloud to the ground station.

15. The compute system of claim 13, wherein the smart contracts further govern addition of satellites to, and removal of satellites from, the constellation of satellites, and protocols for launching and positioning of satellites of the constellation of satellites, wherein the blockchain ledger records positioning of each satellite of the constellation of satellites.

16. The computer system of claim 15, wherein the operating further comprises the service provider adding a satellite to the constellation of satellites pursuant to a smart contract term defined by a smart contract of the smart contracts and indicating a proper position for the added satellite in the constellation.

17. The computer system of claim 15, wherein the operating further comprises the service provider repositioning a satellite, of the one or more satellites operated by the service provider, pursuant to a smart contract term, defined by a smart contract of the smart contracts, for accommodating an added satellite that is added to the constellation of satellites.

18. The computer system of claim 13, wherein the selected device comprises (i) a selected satellite, of the constellation of satellites, or (i) a selected ground station, of the collection of ground stations, the selected satellite or ground station being operated by another service provider of the different service providers, wherein the method further comprises recording to the blockchain ledger financial information related to the another service provider contributing to servicing the request for the data, the financial information indicating at least one selected from the group consisting of: a duration of time which the another service provider contributed to servicing the request, an amount of data transmitted via the selected device in contributing to servicing the request, and a type of data communication performed by the selected device in contributing to servicing the request.

19. The computer system of claim 13, wherein the blockchain ledger records satellite information including health condition, life expectancy, available storage space, load, positioning, and direction of movement of each satellite of the constellation of satellites, and validates the satellite information against at least some of the terms of the smart contracts, and wherein the operating further comprises the service provider identifying which of the one or more satellites operated by the service provider are to be decommissioned or repositioned to satisfy requirements under the smart contracts.

20. A computer program product comprising:
a computer readable storage medium readable by a processing circuit and storing instructions for execution by the processing circuit for performing a method comprising:
obtaining terms of smart contracts, the terms being recorded on a blockchain ledger, the smart contracts governing utilization of a constellation of Earth-orbiting satellites, which form a space-based data center, in transmitting data between the constellation of satellites and a collection of ground stations for receiving data transmissions, wherein different service providers operate different satellites of the constellation of satellites and different ground stations of the collection of ground stations, and wherein the smart contracts further govern servicing of requests made between the different service providers; and
operating, by a service provider of the different service providers, one or more satellites of the constellation of satellites pursuant to the smart contracts, and one or more ground stations of the collection of ground stations, the operating comprising:
receiving, by the service provider, a request for data stored on a satellite of the constellation of the satellites;
selecting a device to which the satellite is to send the data, the selecting being based on at least one smart contract term defined by one or more of the smart contracts, and the selecting being a selection made between at least (i) a ground station of the collection of ground stations and (ii) another satellite of the constellation of satellites; and
initiating sending the data to the selected device by the satellite.

* * * * *